United States Patent
Maret et al.

(10) Patent No.: US 9,584,615 B2
(45) Date of Patent: Feb. 28, 2017

(54) REDIRECTING ACCESS REQUESTS TO AN AUTHORIZED SERVER SYSTEM FOR A CLOUD SERVICE

(71) Applicant: Adobe Systems Incorporated, San Jose, CA (US)

(72) Inventors: Timothée Vincent Maret, Lausanne (CH); Tobias Martin Bocanegra Alvarez, San Francisco, CA (US); Antonio Sanso, Allschwil (CH)

(73) Assignee: Adobe Systems Incorporated, San Jose, CA (US)

(*) Notice: Subject to any disclaimer, the term of this patent is extended or adjusted under 35 U.S.C. 154(b) by 194 days.

(21) Appl. No.: 14/091,830

(22) Filed: Nov. 27, 2013

(65) Prior Publication Data

US 2015/0149530 A1 May 28, 2015

(51) Int. Cl.
*G06F 15/16* (2006.01)
*H04L 29/08* (2006.01)

(52) U.S. Cl.
CPC ...... *H04L 67/2814* (2013.01); *H04L 67/1014* (2013.01); *H04L 67/1002* (2013.01)

(58) Field of Classification Search
CPC ............. H04L 67/1002; H04L 67/1004; H04L 67/1006; H04L 67/1014; H04L 67/2814
See application file for complete search history.

(56) References Cited

U.S. PATENT DOCUMENTS

| 7,954,144 B1* | 5/2011 | Ebrahimi | H04L 63/102 709/227 |
| 8,347,083 B1* | 1/2013 | Scudder | H04L 63/0435 713/159 |
| 8,800,011 B2* | 8/2014 | Bray | H04L 61/1511 709/223 |
| 8,959,650 B1* | 2/2015 | Richards | G06F 21/44 709/227 |
| 9,237,020 B2* | 1/2016 | Chang | H04L 9/3213 |
| 2006/0112422 A1* | 5/2006 | Tevosyan | H04L 63/0807 726/9 |
| 2011/0307947 A1* | 12/2011 | Kariv | H04L 63/08 726/9 |
| 2013/0086669 A1* | 4/2013 | Sondhi | G06F 21/41 726/8 |
| 2013/0268767 A1* | 10/2013 | Schrecker | G06F 21/31 713/185 |

(Continued)

*Primary Examiner* — Dhairya A Patel
(74) *Attorney, Agent, or Firm* — Kilpatrick Townsend & Stockton LLP

(57) ABSTRACT

In some embodiments, a first server system of a cloud service can receive a bearer token for accessing the cloud service. The bearer token can be generated based on authenticating a remote client in communication with the first server system. The first server system can determine that a resource of the cloud service is hosted by a second server system of the cloud service rather than the first server system. The resource can be identified using the bearer token. The first server system can provide the bearer token to the remote client along with redirect information for accessing the second server system. The second server system can in respond to receiving the bearer token from the remote client by establishing a session with the remote client. The remote client can access the resource via the session with the second server system.

15 Claims, 4 Drawing Sheets

(56) References Cited

U.S. PATENT DOCUMENTS

| | | | |
|---|---|---|---|
| 2014/0172929 A1* | 6/2014 | Sedayao | G06F 17/30212 707/827 |
| 2014/0222900 A1* | 8/2014 | Todd | H04L 67/2842 709/203 |
| 2015/0089623 A1* | 3/2015 | Sondhi | H04L 63/08 726/9 |

* cited by examiner

REDIRECTING ACCESS REQUESTS TO AN AUTHORIZED SERVER SYSTEM FOR A CLOUD SERVICE

TECHNICAL FIELD

This disclosure relates generally to computer-implemented methods and systems and more particularly relates to redirecting access requests to an authorized cluster for a cloud service.

BACKGROUND

A cloud service may provide access to one or more multi-user applications accessible via a data network, such as the Internet. The cloud server may provide each application in a separate computing environment. For example, each application may be executed on a separate server system or cluster of a cloud service.

In some cases, different applications executed on different clusters may be accessible via the Internet or another data network via different network identifiers. For example, a cloud service may be accessible via a uniform resource locator ("URL") such as "cloud_service.abc". The cloud service may also include a marketing application and a social media application hosted on different clusters accessible via the respective URLs "marketing.cloud_service.abc" and "social_media.cloud_service.abc". Subscribers to the cloud service may have client accounts specific to the marketing application or the social media application. For example, a user name and password used to access the marketing application via the URL "marketing.cloud_service.abc" may not be usable for accessing the social media application via the URL "social_media.cloud_service.abc". Alternatively, different clusters used for accessing a common application may handle different subsets of client accounts. A user whose client account is managed by a first cluster may be unable to access the cloud service via second cluster that manages different client accounts.

Prior solutions for addressing this problem may present disadvantages. For example, prior solutions may involve using a centralized authentication server accessible via the URL "cloud_service.abc". The centralized authentication server can authenticate both users of the marketing application and users of the social media application. Using a centralized authentication server may decrease the responsiveness of the cloud service due to high traffic loads. Using a centralized authentication server may also create a single point of failure for accessing the cloud, thereby decreasing the reliability of the cloud service.

SUMMARY

One embodiment involves a first server system of a cloud service receiving a bearer token for accessing the cloud service. The bearer token is generated based on authenticating a remote client in communication with the first server system. The embodiment also involves the first server system determining that a resource of the cloud service is hosted by a second server system of the cloud service rather than the first server system. The first server system can use the bearer token to identify the resource. The embodiment also involves the first server system providing the bearer token to the remote client along with redirect information for accessing the second server system. The embodiment also involves establishing a session between the second server system and the remote client for accessing the resource. The session can be established in response to the second server system receiving the bearer token from the remote client.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
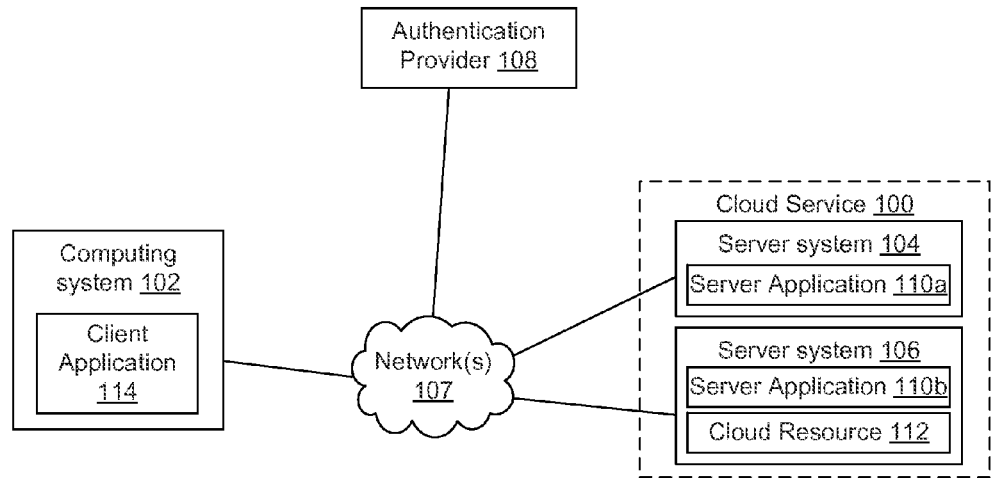
FIG. 1 is a modeling diagram depicting an example of a cloud service accessible by a client computing system.

Computer-implemented systems and methods are disclosed for redirecting access requests to an authorized cluster or server system for a cloud service. A computing cluster can include multiple computing systems communicatively coupled for distributing processing, data storage, and other tasks among the computing systems in the computing cluster. Different clusters, i.e., server systems, of a cloud service can be accessible via the Internet or another data network for receiving requests to access the cloud service. Each cluster can determine whether a remote client attempting to access the cloud service is authorized to access both the cloud service and the particular feature of the cloud service hosted by the cluster. If the remote client is authorized to access the cloud service, but not the particular feature of the cloud service hosted by the cluster, the cluster can redirect the remote client to the proper cluster in the cloud service.

The following non-limiting example is provided to help introduce the general subject matter of certain embodiments. A cloud service may be used to provide a content management system. Different clusters in the cloud service may provide access to different sets of electronic content accessible via the content management system. The different clusters may be accessible by different uniform resource locators ("URL") or other network identifiers. For example, a cloud service associated with a domain "cloud service.abc" may offer a marketing application and a social media application hosted on different clusters accessible via the respective URLs "marketing.cloud_service.abc" and "social_media.cloud_service.abc". A given user may be authorized to access electronic content provided by one cluster in the cloud service, but may not be authorized to access electronic content provided by a different cluster in the cloud service. For example, the user may have a subscriber account for the marketing application but not the social media application. The user that is authorized to access content in a first cluster may attempt to access the cloud service via a URL for a second cluster that hosts electronic content that the user is not authorized to access. For example, a publicly accessible web site in the "cloud_service.abc" domain may display a URL link for the social media application in the "social_media.cloud_service.abc" sub-domain. The user may mistakenly click the URL link for "social_media.cloud_service.abc", thinking that any link with a "cloud_service.abc" domain will provide access to the marketing application. The second cluster (e.g., the cluster hosting the social media application) can respond to the access request by determining that the user is authorized to access the cloud service via the first cluster (e.g., the marketing application) and providing a cookie to the user's web browser that redirects the user to the URL for the authorized cluster (e.g., "marketing.cloud_service.abc"). The cookie can also include a bearer token indicating that the user has been authenticated for accessing the cloud service. Subsequent attempts by the user's web browser to access the URL for the unauthorized cluster can be redirected to the authorized cluster along with the bearer token.

In accordance with some embodiments, instances of a server application can be executed on multiple server systems in a cloud service for authenticating access requests for the cloud service. For example, a first server system of a cloud service can receive a bearer token for accessing the cloud service. The bearer token can be generated by an authentication provider included in or accessible by the first server system. The bearer token can be generated by the authentication provider based on authenticating a remote client that is in communication with the first server system, e.g., a remote client that accessed the first server system attempting to access the cloud service. The first server system can use the bearer token to determine that the remote client is authorized to access the cloud service, but that a given resource that the client is authorized to use is hosted by a different server system in the cloud service. For example, the first server system and the second server systems may be different computing clusters in a cloud service that host different types of services or different sets of electronic content in the cloud service. In response to determining that the bearer token authorizes access to a resource hosted by the second server system, the first server system can provide the bearer token to the remote client along with redirect information for accessing the second server system. For example, the first server system can generate and transmit a cookie that includes the bearer token and a redirect command identifying a URL for the second server system. A web browser or other application executed at the remote client receiving this redirect command is redirected to the second system, i.e., it sends a request to the second server system. The remote client can additionally or alternatively store the cookie for accessing the cloud service. In subsequent attempts by the remote client to access the cloud service, the web browser or other application can determine, based on the cookie, to direct requests for the URL of the first server system to the URL of the second server system. The requests transmitted to the second server system can include the bearer token, which also may be stored on the remote client device. The second server system can establish a session with the remote client in response to the second server system receiving the bearer token from the remote client. The remote client can access the cloud resource via the session.

As used herein, the term "cloud service" is used to refer to one or more computing resources (including computing systems and/or applications) that can be provided as an online service via a data network. The collection of computing systems and/or hardware can be represented as a single service. The cloud service can provide a digital hub for browsing, creating, sharing, and otherwise using electronic content using one or more applications provided via the cloud service.

As used herein, the term "remote client" is used to refer to any entity that communicates with the server system via a data network. For example, a remote client can include a client application such as (but not limited to) a web browser application used to access the server system via a web site.

As used herein, the term "bearer token" is used to refer to a token that can be used to verify that an entity in possession of the token is authorized to access a protected resource hosted by or accessible via a server system. In some embodiments, an entity in possession of a bearer token can use the bearer token to access the protected resource without demonstrating possession of a cryptographic key by the entity. A bearer token can be generated by an authentication provider, such as (but not limited to) an OAuth authentication server.

As used herein, the term "session" is used to refer to a period of time during which an entity is authorized to access one or more applications hosted by or accessible via a server system. A session can be delineated by a first point in time at which an entity is authenticated and a second point in time at which the authentication is terminated. The authentication can be terminated by the entity logging out of a server application, the authentication expiring after a period of inactivity or other predetermined time period, etc.

As used herein, the term "entity" is used to refer to an individual, organization, or other logical identity that can be uniquely identified by an application executed on a server system. An entity can be identified by reference to one or more client accounts and/or by reference to a software identifier and/or hardware identifier associated with an application and/or device used to access the server system.

In some embodiments, different clusters used for accessing a common application may handle different subsets of client accounts. A user whose client account is managed by a first cluster may be unable to access the cloud service via second cluster that manages different client accounts. The second cluster can respond to a login request by the user by providing a cookie that redirects the user's web browser to the first cluster.

In some embodiments, a user that has been redirected to a correct cluster can bookmark the URL for the correct cluster. The bookmark can allow the user to login directly to the correct cluster in subsequent logins.

Referring now to the drawings, FIG. 1 is a modeling diagram depicting an example of a cloud service 100 accessible by a client computing system 102. A non-limiting example of a cloud service 100 is a content management service. A content management service can be used for organizing, creating, and/or managing access to electronic content across different communication channels (e.g., content accessible via the Internet, content accessible via e-mail, etc.). Different portions of the electronic content can be hosted by or otherwise accessible via different server systems used to implement the cloud service 100.

The cloud service can include server systems 104, 106 accessible via a data network 107. Each of the server systems 104, 106 can execute respective server applications 110a, 110b. Each of the server applications 110a, 110b can include executable code for performing one or more processes that authenticate entities attempting to access resources provided via the cloud service 100. The server applications 110a, 110b being executed on multiple server systems 104, 106 can provide multiple access points for the cloud service 100.

Providing multiple access points for the cloud service 100 can reduce or eliminate difficulties associated with having a centralized access point for accessing the cloud service 100 (e.g., a central authentication server system accessible via a URL). In one non-limiting example, providing multiple access points for the cloud service 100 may increase the efficiency with which entities are authorized for access to the cloud service 100. The efficiency of authorizing entities for access can be increased by distributing access requests across multiple server systems 104, 106 of the cloud service 100. In another non-limiting example, providing multiple access points for the cloud service 100 can allow continued access to the cloud service 100 in the event that one of the access points fails or otherwise malfunctions. In some embodiments, a malfunction can cause a user to be redirected to a default access point for the cloud service.

Although FIG. 1 depicts two server systems 104, 106 for illustrative purposes, a cloud service 100 can be implemented using any number of server systems. Although FIG. 1 depicts a single server for each of the server systems 104, 106, other implementations are possible. For example, one or more of the server systems 104, 106 can be a computing cluster. A computing cluster can include multiple computing systems communicatively coupled for distributing processing, data storage, and other tasks among the computing systems in the computing cluster.

The server system 106 can also host a cloud resource 112. The cloud resource 112 can include any electronic content that may be accessible via the cloud service 100. Non-limiting examples of a cloud resource 112 can include text, multimedia files, (e.g., images, video, audio, or any combination thereof), application software, etc.

Although FIG. 1 depicts a single cloud resource 112 hosted from the server system 106 for illustrative purposes, other implementations are possible. For example, any number of cloud resources can be hosted by each of the server systems 104, 106 providing the cloud service 100.

A client application 114 can be executed by the computing system 102 to access resources via the cloud service 100. A non-limiting example of the client application 114 is a web browser application that can establish a session with a web site via which the cloud service may be accessed.

In some embodiments, the cloud service 100 can communicate with an authentication provider 108 that is used to authenticate users or other entities requesting access to the cloud service 100. In some embodiments, the authentication provider 108 can include one or more server systems in a network domain external to the cloud service 100 and in communication with the cloud service 100 via the data network 107, as depicted in FIG. 1. In other embodiments, the authentication provider 108 can include one or more server systems included in the same network domain as the cloud service 100.

The authentication provider 108 can generate bearer tokens that can be used by remote clients to access resources in the cloud service 100. A non-limiting example of a bearer token is a string of alphanumeric characters representing an access authorization issued to a remote client. The bearer token can include a string or other data that is different from credentials used for authenticating the user or other entity (e.g., a username and password, a challenge question and a response to the challenge, etc.). A bearer token or other token can be valid for a limited period of time and include a time-to-live indicator or other data identifying the period of time. A non-limiting example of an authorization provider is an authentication server system that uses an OAuth authentication protocol.

In some embodiments, the bearer token can include a network identifier for a server system, network domain, or other network resource identifying which cloud resources are accessible via the token. In other embodiments, the bearer token can include a network identifier for the authentication provider 108 and an identifier associated with a credential used to generate the bearer token. A recipient of the token (e.g., one or more of the server systems 104, 106) can establish a secure communication channel with the authentication provider 108 in response to receiving the token. The recipient can communicate with the authorization provider via the secure communication channel to verify the validity of the bearer token.

Figure 2:
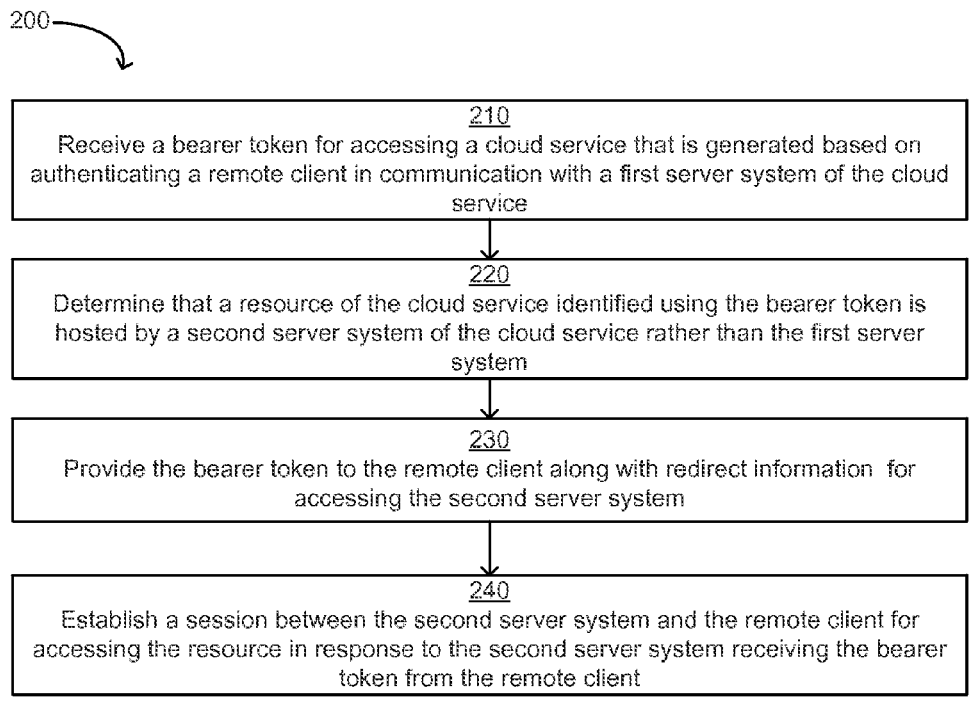
FIG. 2 is a flow chart illustrating an example method for redirecting access requests to an authorized cluster for a cloud service.

The server applications 110a, 110b can be used to redirect access requests received from the client application 114 to an appropriate cluster in the cloud service 100. For example, FIG. 2 is a flow chart illustrating an example method 200 for redirecting access requests to an authorized cluster for a cloud service. For illustrative purposes, the method 200 is described with reference to the systems depicted in FIG. 1. Other implementations, however, are possible.

The method 200 involves receiving a bearer token for accessing a cloud service, as depicted in block 210. The bearer token can be generated based on authenticating a remote client in communication with a first server system of the cloud service. For example, a server system 104 in communication with a client computing system 102 can obtain or otherwise receive the bearer token from an authentication provider 108.

Figure 3:
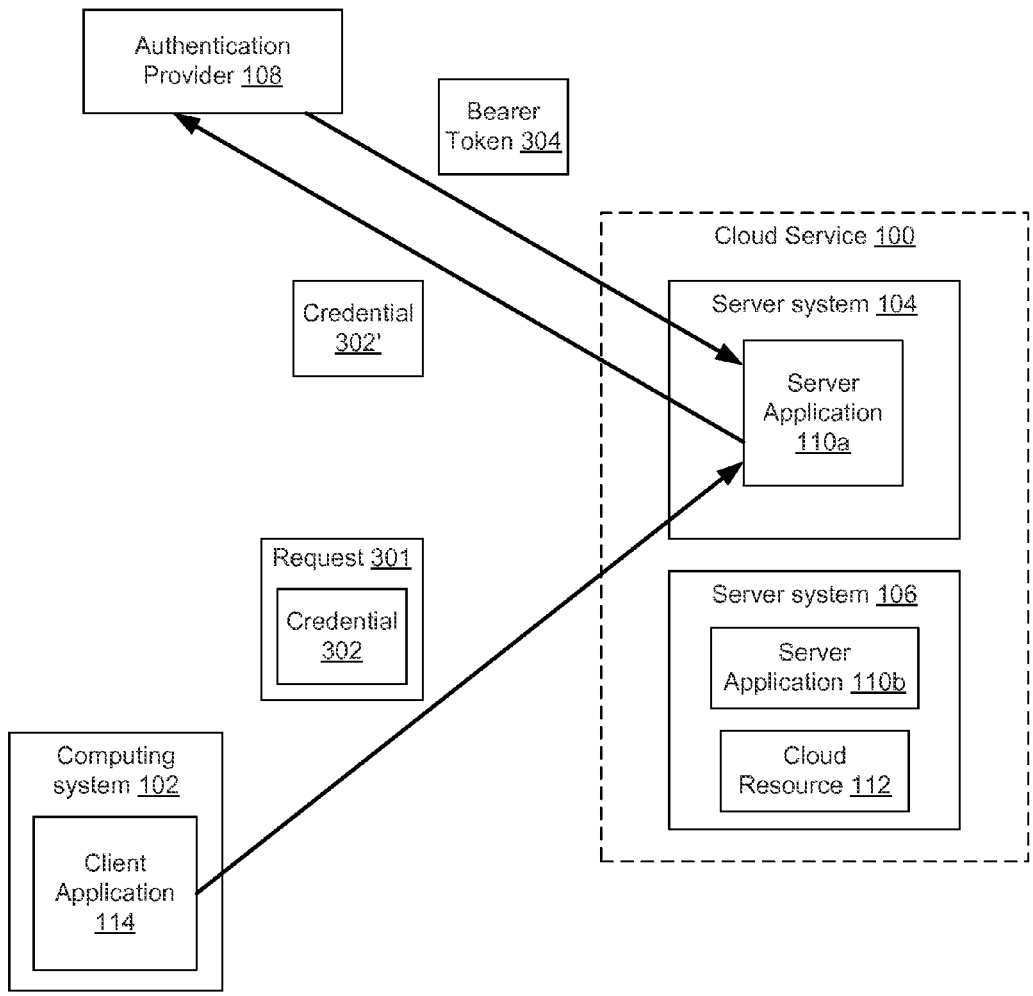
FIG. 3 is a modeling diagram depicting an example flow of communications among the computing system, the cloud service, and an authentication provider for obtaining a bearer token.

Any suitable process can be used for obtaining the bearer token. For example, FIG. 3 is a modeling diagram depicting an example flow of communications among the computing system 102, the cloud service 100, and the authentication provider 108 for obtaining a bearer token.

The server application 110a can provide a login form or other suitable interface to the client application 114 in response to the client application 114 accessing a network identifier for the server system 104. The login form or other suitable interface can include one or more data fields for soliciting a credential 302. The client application 114 can receive the credential 302 from a user or other entity via the interface and provide the credential 302 to the server application 110a. Non-limiting examples of the credential 302 may include a user name, a password, or some combination thereof for a user or other entity requesting access to the cloud service 100. The client application 114 can use the interface to transmit an access request 301 including the credential 302 to the server system 104 via the data network 107.

The server application 110a can provide a copy of the credential 302' to the authentication provider 108. The authentication provider 108 can authenticate the user or other entity based on the received copy of the credential 302'. For example, the authentication provider 108 can compare a credential 302' that includes a user name and password with a user name and password in a client account accessible to the authentication provider 108.

The authentication provider 108 can generate a bearer token 304 based on authenticating the credential 302'. The bearer token 304 can indicate that an entity in possession of the bearer token 304 is authorized to access the cloud service 100. The authentication provider 108 can provide the bearer token 304 to the server application 110a. The server application 110a can determine that the client application 114 is authorized to access the cloud service 100 based on the bearer token 304.

Returning to FIG. 2, the method 200 further involves determining that a resource of the cloud service identified using the bearer token is hosted by a second server system of the cloud service rather than the first server system, as depicted in block 220. For example, the server application 110a may use the bearer token 304 to determine that the client application 114 is authorized to access the cloud resource 112. The server application 110a can determine that the cloud resource 112 is not hosted by or otherwise accessible via the server system 104. The server application 110a can also determine that the cloud resource 112 is hosted by or otherwise accessible via the server system 106. In one non-limiting example, the bearer token may include information indicating that that the cloud resource 112 is hosted by or otherwise accessible via the server system 106. In another non-limiting example, the bearer token may allow the server application 110a to obtain information from the authentication provider 108 indicating that the cloud resource 112 is hosted by or otherwise accessible via the server system 106. The bearer token can allow the server application 110a to obtain a customer identifier from the authentication provider 108 by providing the token to the authentication provider 108. The server 110a can generate a URL based on the customer identifier that identifies the server system 106 hosting the resource 112. The customer identifier can be used to generate the URL using a structured set of hostnames (e.g. "customerId.service.abc").

In some embodiments, the server application 110a can communicate with the authentication provider 108 to identify one or more cloud resources that the client application 114 is authorized to access. For example, the server application 110a may transmit a message to the authentication provider 108 that requests one or more resource identifiers associated with the bearer token 304. The one or more resource identifiers associated with the bearer token 304 can identify the cloud resources that a possessor of the bearer token 304 is authorized to access. The one or more resource identifiers can also identify one or more server systems of the cloud service 100 via which the identified cloud resources can be accessed. The authentication provider 108 can provide the one or more resource identifiers to the server application 110a. The server application 110a can compare the cloud resources identified in the resource identifier to a list of resources hosted by or otherwise accessible via the server system 104. For example, the server application 110a can determine from the resource identifier that the bearer token 304 permits access to a cloud resource 112. The server application 110a can determine that the cloud resource 112 is hosted by the server system 106 rather than the server system 104.

In a non-limiting example, the server application 110a may obtain a resource identifier by retrieving a profile for a user or other entity corresponding to the credential 302 from the authentication provider 108. Such a profile may identify the cloud resources that the user or other entity is authorized to access. For example, the profile may indicate that the user or other entity is a customer of the cloud service 100 and that the user or other entity has a subscription for a cloud resource 112 (e.g., a marketing application provided by the cloud service 100). The server application 110a can determine that the marketing application is executed by the server system 106.

Figure 4:
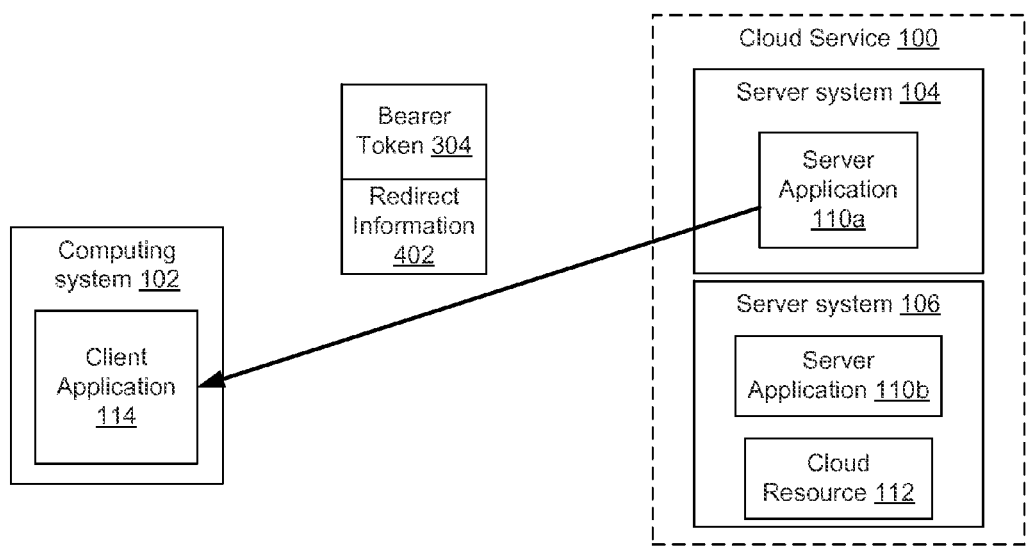
FIG. 4 is a modeling diagram depicting an example flow of communications between the cloud service and the computing system for redirecting an access request.

The method 200 further involves providing the bearer token to the remote client along with redirect information for accessing the second server system, as depicted in block 230. For example, FIG. 4 is a modeling diagram depicting an example flow of communications between the cloud service and the computing system for redirecting an access request. The server application 110a executed by the server system 104 can provide the bearer token 304 along with redirect information 402 to the client application 114 via the data network 107. The redirect information 402 can identify one or more server systems in the cloud service 100 that host or otherwise provide access to a cloud resource 112.

In some embodiments, the redirect information 402 can include a network identifier for the server system 106. For example, the redirect information 402 can include a URL or other network identifier for a server system 106 in the network domain for the cloud service 100 or in a sub-domain of the cloud service 100. The redirect information 402 can also include a redirect command, such as executable code for performing an HTTP redirect.

In some embodiments, the server application 110a can generate a cookie that includes the bearer token 304 along with the network identifier, a redirect command, or other redirect information 402. The server application 110a can securely transmit the cookie with the bearer token 304 and redirect information 402 to the client application 114 via the data network 107. For example, the server application 110a can establish a secure communication channel with the client application 114 using Transport Layer Security ("TLS") or another cryptographic protocol. The server application 110a can transmit the cookie via the secure communication channel. The client application 114 (such as, but not limited to, a web browser) can store the cookie. The client application 114 can use the redirect information to cause subsequent requests for accessing the server system 104 to be redirected to the server system 106 using the network identifier in the redirect information 402.

Returning to FIG. 2, the method 200 further involves establishing a session between the second server system and the remote client for accessing the resource, as depicted in block 240. The server system 106 can establish the session with the computing system 102 in response to the computing system 102 providing the bearer token 304 to the server system 104.

Figure 5:
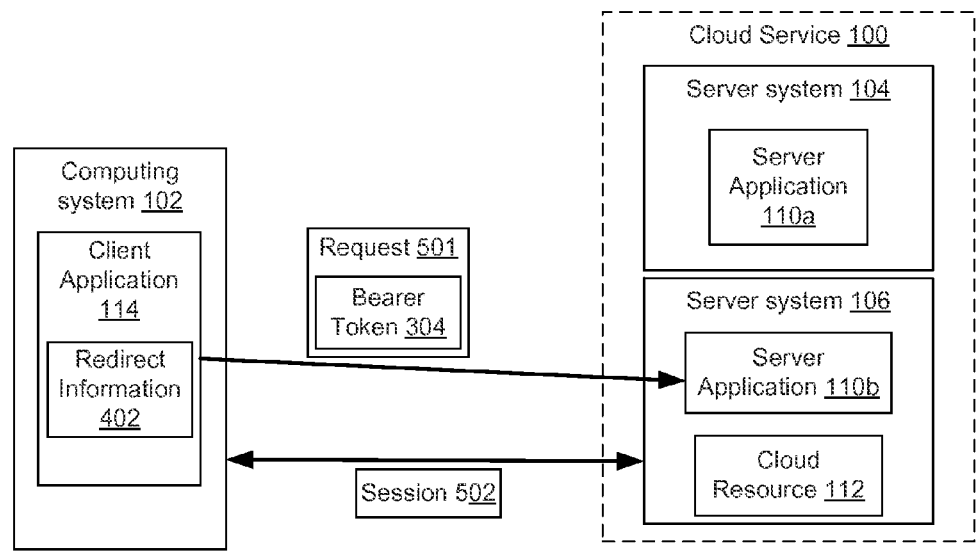
FIG. 5 is a modeling diagram depicting an example flow of communications between the cloud service and the computing system for establishing a session for accessing a cloud resource in response to a redirected access request.

For example, FIG. 5 is a modeling diagram depicting an example flow of communications between the cloud service 100 and the computing system 102 for establishing a session 502 for accessing a cloud resource 112 in response to a redirected access request 501. The client application 114 can use the redirect information 402 to generate an access request 501 for requesting access to the cloud service 100 from the server system 106. The access request 501 can include the bearer token 304. The computing system 102 can transmit the access request 501 to the server system 106 via the data network 107.

The server system 106 can execute the server application 110b to verify that the bearer token 304 included in the access request 501 is valid. Verifying that the bearer token 304 is valid can include determining that the bearer token 304 permits access to the cloud service 100 and/or determining that the bearer token 304 has not expired. The server application 110b can establish an authenticated session 502 with the client application 114 based on determining that the bearer token 304 is valid. The server application 110b can also determine that the cloud resource 112 identified using the bearer token 304 is hosted by or accessible via the server system 106. The server application 110b can provide access to the cloud resource 112 by the client application 114 via the session 502.

In some embodiments, the server application 110b can communicate with the authentication provider 108 to identify the cloud resources that the client application 114 is authorized to access. For example, the server application 110b may transmit a message to the authentication provider 108 that requests one or more resource identifiers associated with the bearer token 304. The authentication provider 108 can provide the one or more resource identifiers to the server application 110b. The server application 110b can compare the cloud resources identified in the resource identifier to a list of resources hosted by or otherwise accessible via the server system 106. The server application 110b can determine that the cloud resource 112 is hosted by the server system 106.

In some embodiments, the server system 106 can maintain client accounts that identify remote clients authorized to access the cloud resource 112. The authentication provider 108 can provide one or more resource identifiers in a profile associated with the bearer token 304. The server application 110b can add or update a client account for the user or entity based on the profile information provided by the authentication provider 108.

Figure 6:
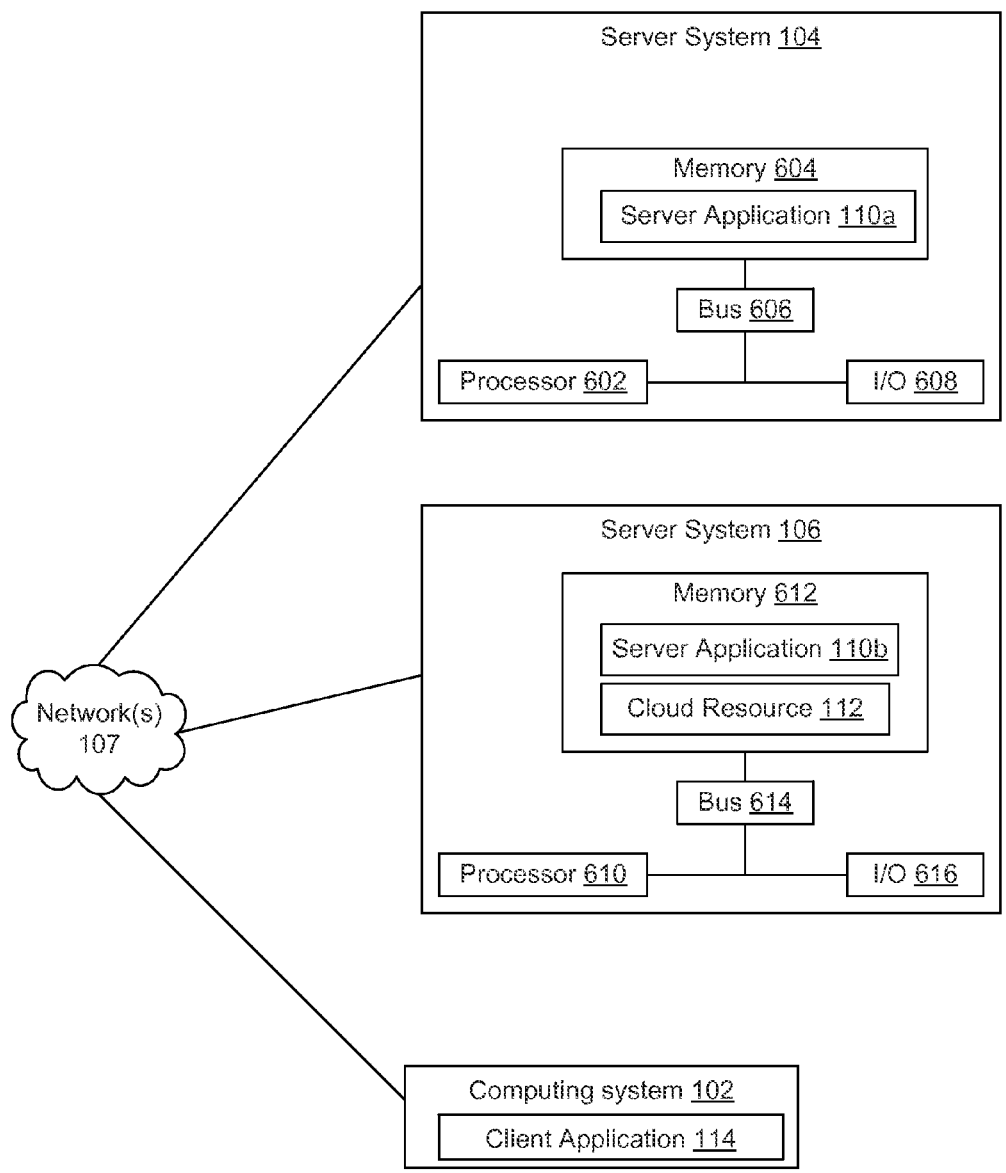
FIG. 6 is a block diagram depicting examples of computing systems for implementing certain embodiments.

Any suitable computing system or architecture can be used to implement the cloud service 100. For example, FIG. 6 is a block diagram depicting examples of computing systems for implementing certain embodiments. The example computing systems include the server systems 104, 106 in communication with the computing system 102 via one or more data networks 107.

The server systems 104, 106 can respectively include processors 602, 610. Each of the processors 602, 610 may include a microprocessor, an application-specific integrated circuit ("ASIC"), a state machine, or other suitable processing device. Each of the processors 602, 610 can include any number of computer processing devices, including one. Each of the processors 602, 610 can be communicatively coupled to a respective computer-readable medium, such as memories 604, 612. The processors 602, 610 can execute computer-executable program instructions and/or accesses information stored in the respective memories 604, 612. Each of the memories 604, 612 can store instructions that, when executed by the processors 602, 610, cause a respective one of the processors 602, 610 to perform operations described herein. Examples of such instructions include the server applications 110a, 110b.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server systems 104, 106 can also respectively include buses 606, 614 and input/output ("I/O") interfaces 608, 616. Each of the buses 606, 614 can communicatively couple one or more components of a respective one of the server systems 104, 106. Each of the I/O interfaces 608, 616 can receive input from input devices (e.g., a keyboard, a mouse, a touch screen, etc.) and provide output to output devices.

Each of the server systems 104, 106 can include any suitable computing system or group of computing systems for hosting or accessing server applications 110a, 110b and/or the cloud resource 112. In some embodiments, each of the server systems 104, 106 may be a single computing system. In other embodiments, each of the server systems 104, 106 may be a virtual server implemented using a number of computing systems connected in a grid or distributed computing topology.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for efficiently enabling access to cloud-hosted resources by remote clients in communication with cloud-based computing systems, the method comprising:
   receiving, by a first server system of a cloud service, a bearer token for accessing the cloud service, wherein the bearer token is generated based on authenticating a remote client in communication with the first server system;
   determining, by the first server system, that a resource of the cloud service is hosted by a second server system of the cloud service rather than the first server system, wherein the first server system determines that the resource is hosted by the second server system based at least in part on the bearer token, wherein determining that the resource is hosted by the second server system comprises:
      requesting a resource identifier from an authentication provider that provided the bearer token to the first server system,
      receiving the resource identifier from the authentication provider, and
      determining that the resource identifier identifies the resource that is hosted by the second server system and that is not hosted by the first server system;
   redirecting the remote client to the resource at the second server system based on determining that the resource of the cloud service is hosted by the second server system of the cloud service rather than the first server system, wherein redirecting the remote client comprises:
      generating, by the first server system, a cookie comprising the bearer token and a redirect command for instructing the remote client to access the second server system, and
      transmitting, by the first server system and via a data network, the cookie having the bearer token and the redirect command to the remote client for accessing the second server system;
   receiving, by the second server system, the bearer token and the redirect command from the remote client; and
   establishing, by the second server system, a session between the second server system and the remote client for accessing the resource in response to receiving the bearer token.

2. The method of claim 1, further comprising:
   receiving, by the first server system, a credential from the remote client; and
   providing, by the first server system, the credential to the authentication provider for authenticating the remote client,
   wherein the bearer token is received from the authentication provider in response to providing the credential.

3. The method of claim 1 further comprising:
   receiving, by the first server system, a request for accessing the resource that is directed to a uniform resource locator (URL) associated with the cloud service; and
   wherein the first server system identifies that the resource based at least in part on the request.

4. The method of claim 1, wherein the first server system is accessible via the data network via an additional network identifier different than the network identifier for the second server system.

5. The method of claim 1, wherein the session is established in response to the second server system determining that the bearer token is valid.

6. The method of claim 1, wherein the cloud service comprises a content management service and wherein the resource comprises electronic content hosted by the second server system.

7. The method of claim 1, wherein the first server system and the second server system are configured into a distributed computing system providing the cloud service, wherein which the first server system provides access to a first domain of the distributed computing system and the second server system provides access to a second domain of the distributed computing system.

8. The method of claim 1, wherein the first server system is included in a first cluster of a distributed computing system providing the cloud service and the second server system is included in a second cluster of the distributed computing system providing the cloud service, wherein determining that the resource is hosted by the second server system rather than the first server system comprises determining that the bearer token authorizes access to a service accessible from the second cluster and inaccessible from the first cluster.

9. The method of claim 1, further comprising:
   receiving, by the first server system prior to receiving the bearer token, credentials from a remote client via communications over a data network; and
   authenticating, by the cloud service, the credentials, wherein the bearer token is received by the first server system based on the cloud service authenticating the credentials.

10. A system comprising:
    a first server comprising a first processor and a first memory, the first processor configured for:
       receiving a bearer token for accessing a cloud service including the first server, wherein the bearer token is generated based on authenticating a remote client in communication with the first server system,
       determining that a resource of the cloud service is hosted by a second server system of the cloud service rather than the first server system, wherein the first server system is configured for determining that the resource is hosted by the second server system based at least in part on the bearer token, wherein determining that the resource is hosted by the second server system comprises:
          requesting a resource identifier from an authentication provider that provided the bearer token to the first server system;
          receiving the resource identifier from the authentication provider; and
          determining that the resource identifier identifies the resource that is hosted by the second server system and that is not hosted by the first server system, and
       redirecting the remote client to the resource at the second server system based on determining that the resource of the cloud service is hosted by the second server system of the cloud service rather than the first server system, wherein redirecting the remote client comprises:

generating, a cookie comprising the bearer token and a redirect command for instructing the remote client to access the second server system, and configuring the first server to transmit, via a data network, the cookie having the bearer token and the redirect command to the remote client for accessing the second server system; and the second server, the second server comprising a second processor and a second memory, the second processor configured for:

receiving the bearer token and the redirect command from the remote client, and establishing a session between the second server system and the remote client for accessing the resource in response to receiving the bearer token.

11. The system of claim 10, wherein the first processor is further configured for:

receiving a credential from the remote client; and providing the credential to the authentication provider for authenticating the remote client, wherein the bearer token is received from the authentication provider in response to providing the credential.

12. The system of claim 10, wherein the first server system is accessible via the data network via an additional network identifier different than the network identifier for the second server system.

13. A non-transitory computer-readable medium embodying program code executable by a processing device to perform operations, the operations comprising:

receiving, by a first server system of a cloud service, a bearer token for accessing the cloud service, wherein the bearer token is generated based on authenticating a remote client in communication with the first server system;

determining, by the first server system based at least in part on the bearer token, that a resource of the cloud service is hosted by a second server system of the cloud service rather than the first server system, wherein determining that the resource is hosted by the second server system comprises:

requesting a resource identifier from an authentication provider that provided the bearer token to the first server system, receiving the resource identifier from the authentication provider, and determining that the resource identifier identifies the resource that is hosted by the second server system and that is not hosted by the first server system;

redirecting the remote client to the resource at the second server system based on determining that the resource of the cloud service is hosted by the second server system of the cloud service rather than the first server system, wherein redirecting the remote client comprises:

generating, by the first server system, a cookie comprising the bearer token and a redirect command for instructing the remote client to access the second server system, and transmitting, by the first server system and via a data network, the cookie having the bearer token and the redirect command to the remote client;

receiving, by the second server system, the bearer token and the redirect command from the remote client; and establishing a session between the second server system and the remote client for accessing the resource in response to the second server system receiving the bearer token and the redirect command.

14. The non-transitory computer-readable medium of claim 13, the operations further comprising:

receiving, by the first server system, a credential from the remote client; and providing, by the first server system, the credential to the authentication provider for authenticating the remote client, wherein the bearer token is received from the authentication provider in response to providing the credential.

15. The non-transitory computer-readable medium of claim 13, wherein the first server system is accessible via the data network via an additional network identifier different than the network identifier for the second server system.

* * * * *